(12) United States Patent
Henry et al.

(10) Patent No.: US 10,091,929 B2
(45) Date of Patent: Oct. 9, 2018

(54) CALIBRATION METHOD FOR ADJUSTABLE ORIFICE VALVE

(71) Applicant: CNH Industrial Canada, Ltd., Saskatoon (CA)

(72) Inventors: James W. Henry, Saskatoon (CA); Mohammad Vakil, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 15/376,196

(22) Filed: Dec. 12, 2016

(65) Prior Publication Data

US 2018/0160617 A1 Jun. 14, 2018

(51) Int. Cl.
| | |
|---|---|
| *A01C 23/04* | (2006.01) |
| *A01C 23/00* | (2006.01) |
| *G05D 7/06* | (2006.01) |

(52) U.S. Cl.
CPC ............ *A01C 23/007* (2013.01); *A01C 23/04* (2013.01); *G05D 7/0641* (2013.01)

(58) Field of Classification Search
CPC ....... A01C 23/04; A01C 23/00; A01C 23/007; G05D 7/0641; G05D 7/0635; G05D 7/0629; G05D 7/0617; G05D 7/06; G05D 7/00
See application file for complete search history.

(56) References Cited

U.S. PATENT DOCUMENTS

| | | |
|---|---|---|
| 2,909,191 A | 10/1959 | Horton |
| 3,786,869 A | 1/1974 | McLoughlin |
| 4,189,005 A | 2/1980 | McLoughlin |
| 4,226,344 A | 10/1980 | Booth et al. |
| 4,432,651 A | 2/1984 | McLeod |
| 4,586,539 A | 5/1986 | Ueno |
| 4,667,695 A | 5/1987 | Gold et al. |
| 5,170,820 A | 12/1992 | Ward |
| 5,301,713 A | 4/1994 | Skoglund |

(Continued)

OTHER PUBLICATIONS

Kranz et al., "EC94-737 Calibrating Anhydrous Ammonia Applicators", http://digitalcommons.unl.edu/cgi/viewcontent.cgi?article=1689&context=extensionhist, Dec. 31, 1994.

*Primary Examiner* — Christopher J Novosad
(74) *Attorney, Agent, or Firm* — Rebecca L. Henkel; Rickard K. DeMille (57) ABSTRACT

A method of calibrating individual exit lines of an agricultural ammonia applicator having a delivery path that extends through a manifold and multiple exit lines includes installing a fixed flow restricting orifice upstream of a variable flow restricting orifice and measuring the pressure upstream of the fixed flow restricting orifice. Beginning with the variable flow restricting orifice in an unrestricting flow condition, the pressure downstream of the variable flow restricting orifice is repeatedly measured and compared with the measured upstream pressure. The variable flow restricting orifice is incrementally closed after each comparison so long as the measured pressure downstream of the variable flow restricting orifice and the pressure upstream of the fixed flow restricting orifice remain substantially the same. The variable orifice maximum flow setting is recorded when the measured pressure downstream of the variable flow restricting orifice drops below the pressure upstream of the fixed flow restricting orifice.

13 Claims, 6 Drawing Sheets

(56) References Cited

U.S. PATENT DOCUMENTS

| | | |
|---|---|---|
| 5,574,657 A | 11/1996 | Tofte et al. |
| 5,888,051 A | 3/1999 | McLoughlin et al. |
| 5,967,066 A | 10/1999 | Giles et al. |
| 6,148,843 A | 11/2000 | Pringle |
| 6,152,168 A | 11/2000 | Ohmi et al. |
| 6,694,825 B2 | 2/2004 | Nimberger et al. |
| 6,973,936 B2 | 12/2005 | Watson |
| 7,063,276 B2 | 6/2006 | Newton |
| 7,162,961 B2 | 1/2007 | Grimm et al. |
| 7,255,012 B2 | 8/2007 | Hedtke |
| 8,132,783 B2 | 3/2012 | Luebbers |
| 8,544,321 B2 | 10/2013 | Jones, III |
| 9,144,191 B1 | 9/2015 | Gramling et al. |
| 9,468,940 B2 | 10/2016 | Henry et al. |
| 2009/0114391 A1 | 5/2009 | Smith, IV et al. |
| 2014/0131469 A1* | 5/2014 | Henry ............... B05B 1/3046 239/11 |
| 2014/0239082 A1 | 8/2014 | Freeman et al. |
| 2015/0039179 A1 | 2/2015 | Boothe |
| 2016/0007524 A1 | 1/2016 | Kusler et al. |

\* cited by examiner

CALIBRATION METHOD FOR ADJUSTABLE ORIFICE VALVE

BACKGROUND OF THE INVENTION

1. Field of the Invention

The present invention relates to agricultural machinery, and, more particularly, to such machinery for dispensing fertilizing materials.

2. Description of the Related Art

Anhydrous ammonia is rich in nitrogen and apparatus for the subterranean application of anhydrous ammonia fertilizers is common. A typical anhydrous ammonia fertilizing system has a manifold with a plurality of discharge lines connected to soil engaging knives.

Keeping anhydrous ammonia as a liquid which is free of vapor is very important; ammonia in a liquid form produces an even distribution throughout the applicator system. One method of keeping ammonia in a liquid state is to pressurize it. An orifice is then used to change the discharge line's restriction. The pressure and line's restriction can be adjusted such that the desired flow rate is achieved while the ammonia is pressurized and remains liquid. Presently, in order to change the line's restriction (flow rate of ammonia) through the manifold lines, it is necessary to manually change the orifice size at the exit of the manifold. There is currently an orifice in every line coming out of the manifold of the applicator. Orifices are designed for a limited range of flow rates and must be substituted to change the flow rate to the ground while the line pressure is maintained at a certain value. Changing all the orifices is inconvenient and time consuming.

A salutary improvement in this area is illustrated in our U.S. Pat. No. 9,468,940. This patented arrangement teaches an ammonia applicator system that has adjustable orifices with openings having variable sizes that can be changed remotely, without having to disassemble exit lines from a distribution manifold. In this way, the restriction of the exit lines and, thus, line flow rate can be adjusted remotely and/or automatically, even during ammonia application use. Each adjustable orifice may include a valve and an actuator that controls the valve for changing the size of the opening of the adjustable orifice. The actuator may be a rotary actuator, such as a stepper motor, and the valve may include an adjustment knob and a screw that can rotate to allow a needle to advance or regress through an opening of a valve body of the valve.

This patent points out the need for calibrating the adjustable orifices prior to use in the field and suggests several calibration techniques including that the calibration may be done by installing a fixed orifice in one of the exit lines that also has an adjustable orifice. The adjustable orifice in the exit line that also has the fixed orifice may be completely backed off so that initially only the fixed orifice provides a restriction in that exit line. The adjustable orifices in the other exit lines may be calibrated to the value of the exit line having the fixed orifice. Once the adjustable orifices in the other exit lines have been calibrated to match that of the fixed orifice, the adjustable orifices in the other exit lines may be adjusted slightly smaller. Then the adjustable orifice in the exit line that also has the fixed orifice is adjusted so that all of the exit lines have the same flow rate.

Currently, there is a considerable difference in the performance of same adjustable orifices for the same location of the adjustment knob. Because of manufacturing accuracy, the location of knob and needle are not consistent.

What is needed in the art is a more reliable and accurate variable orifice calibration technique.

SUMMARY OF THE INVENTION

The present invention provides solutions to the above noted problems of calibrating adjustable flow orifices in ammonia applicator apparatus.

The invention in one form is directed to a method of using an ammonia applicator for fertilizing an agricultural field by directing ammonia from a pressurized tank along a delivery path through a manifold and multiple exit lines. The process is begun by selecting a first of the multiple exit lines for calibration and ensuring that the selected exit line has a fixed flow restricting orifice of maximal size upstream of a variable flow restricting orifice. The fluid pressures upstream of the fixed flow restricting orifice and downstream of the variable flow restricting orifice are measured. Beginning with equal pressures measured upstream and downstream, the size of the variable flow restricting is orifice is decreased until the downstream measured pressure drops below the upstream measure pressure. This setting, which represents a maximum flow status of the variable orifice, is recorded for future use. If less than all exit lines have been calibrated, a next exit line is selected for calibration and the processes repeated. If all exit lines have been calibrated, the ammonia applicator is ready for fertilizing an agricultural field.

The invention in another form is directed to a calibration technique for variable flow restricting orifices in exit lines from a manifold. The process begins by positioning a fixed flow rate orifice establishing a preferred maximum flow rate in an exit line upstream of a variable flow restricting orifice and measuring the pressure upstream of the fixed flow restricting orifice. Starting with the variable flow restricting orifice in the maximum flow condition, the pressure downstream of the variable flow restricting orifice is repeatedly measured and compared with the measured upstream pressure. The variable flow restricting orifice is incrementally closed after each comparison so long as the measured pressure downstream of the variable flow restricting orifice and the pressure upstream of the fixed flow restricting orifice remain substantially the same. When the measured pressure downstream of the variable flow restricting orifice drops below the pressure upstream of the fixed flow restricting orifice, the variable flow restricting orifice maximum flow setting is recorded and another fixed flow rate orifice establishing another preferred maximum flow rate is positioned in another exit line. The process is then repeated.

An advantage of the present invention is orifice manufacturer's stated tolerances need not be relied on.

Another advantage is there is less chance of error if orifices are accurately calibrated.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
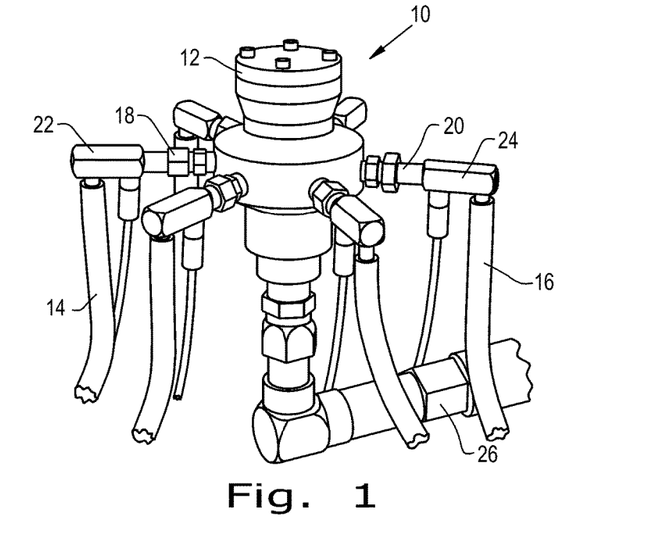
FIG. 1 is an isometric view of an ammonia applicator manifold having variable flow restricting orifices in each outlet line.

Referring now to the drawings, and more particularly to FIG. 1, there is shown an anhydrous ammonia distribution manifold 10 which generally includes a housing 12 with a plurality of exit lines such as 14 and 16. Each exit line is fitted with a flow restricting orifice in the regions such as 18 or 20. Each exit line further includes a remotely controlled adjustable flow restricting orifice or valve as at 22 or 24. Anhydrous ammonia is supplied to the manifold 10 by a pump through line 26. The distribution manifold may be a component of a fertilizer applicator such as one of the Case IH-Nutri-Placer series of fertilizer applicators available from CNH America LLC.

Figure 2:
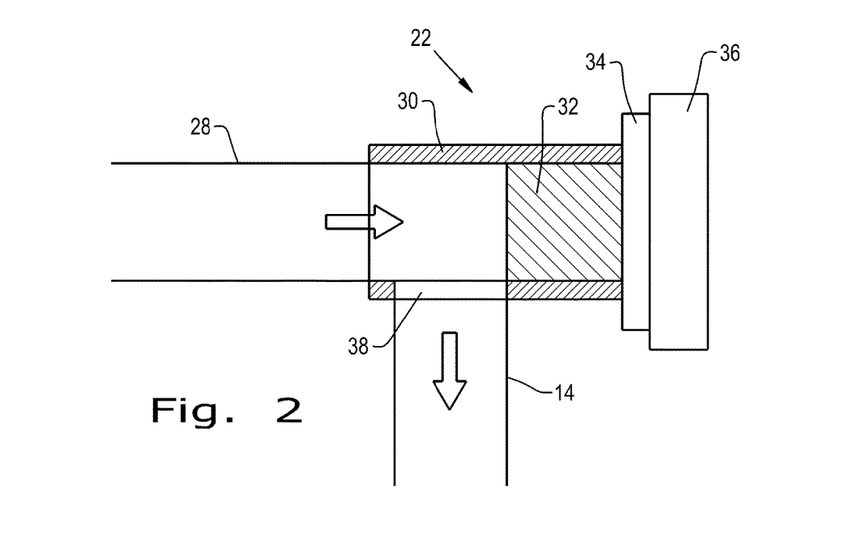
FIG. 2 is a simplified partially schematic cross-sectional view of portions of an exit line of the ammonia applicator manifold of FIG. 1 showing the adjustable valve in the closed condition.

FIG. 2 is a simplified cross-sectional view of an illustrative variable flow restricting orifice 22. Anhydrous ammonia is supplied from the manifold through conduit 28, as indicated by an arrow, into housing 30 and directed downwardly, as shown by another arrow, into the exit line 14. The adjustable flow restricting orifice includes a movable stem 32 controlled by an adjustment knob 34 which is, in turn, rotatable by the remotely controlled stepper motor 36. FIG. 2 represents a wide open status of the adjustable flow restricting orifice (valve).

Figure 3:
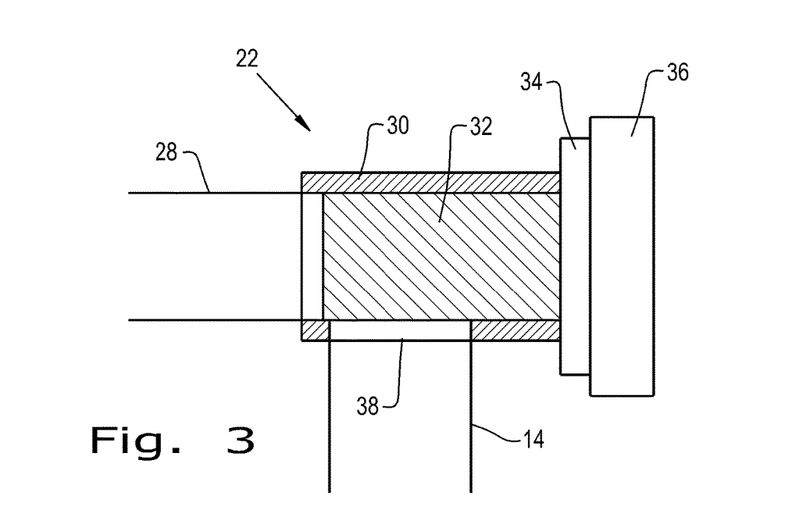
FIG. 3 is a view similar to FIG. 2, but showing the valve in a wide open condition.
Figure 4:
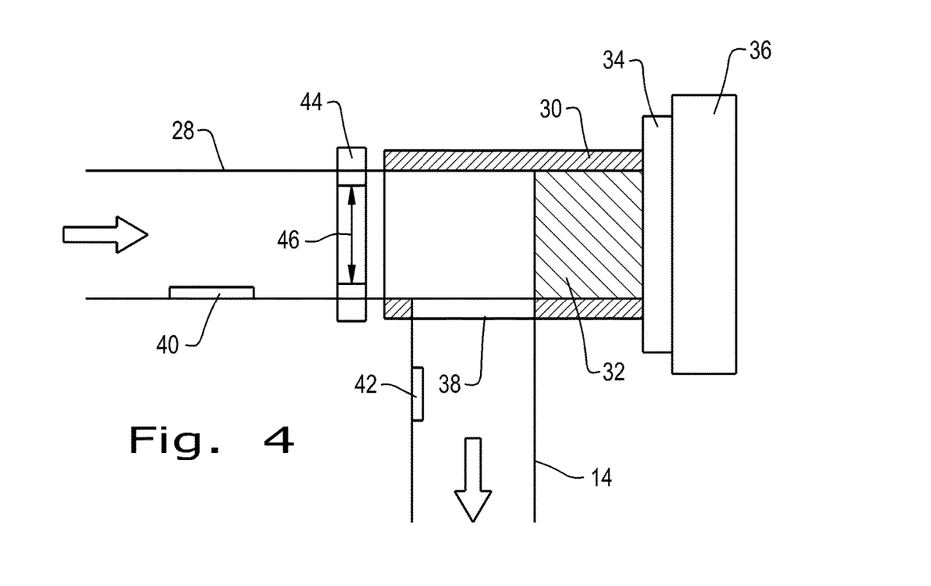
FIG. 4 is a view similar to FIGS. 2 and 3, but showing the valve in a wide open condition preparatory to calibration.

Comparing FIGS. 2 and 3, actuation of the stepper motor 36 induces rotation of control knob 34 causing a threaded portion of stem 32 to rotate advancing the stem leftward as viewed progressively closing the orifice. In FIG. 3, opening 38 is completely blocked by the stem 32. This represents the completely closed status of the adjustable flow restricting orifice In FIG. 4, the variable flow restricting orifice 22 or valve of FIGS. 2 and 3 has been outfitted with an input pressure sensor 40 and an outlet pressure sensor 42. These provide measures the fluid pressure upstream of a fixed flow restricting orifice 44 and the fluid pressure downstream of the variable flow restricting orifice (after opening 38). The size of the aperture in orifice 44 is indicated by arrow 46. Orifice 44 is smaller than the opening 38. Thus opening 38 provides no additional flow restriction and the pressures measured by sensors 40 and 42 are substantially the same. Calibration of the variable orifice by incrementally closing the orifice and comparing upstream and downstream pressures is described in conjunction with FIGS. 7 and 8.

Figure 5:
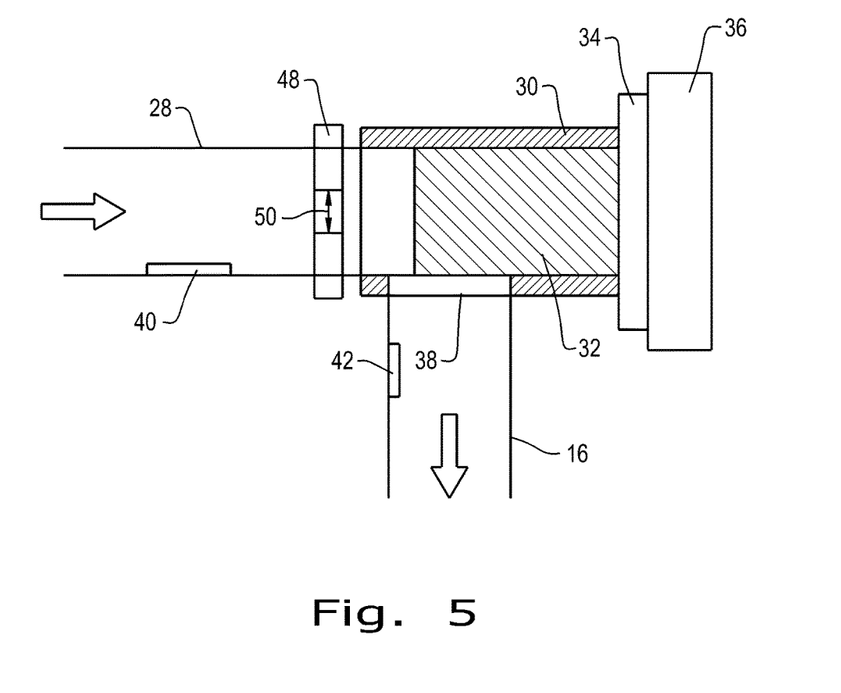
FIG. 5 is a view similar to FIG. 4, but showing the valve condition after calibration.

In FIG. 5, the aperture 44 has been replaced by a different and much smaller fixed aperture 48 having a small size opening 50. The stem 32 has been advanced leftward severely reducing the effective opening at 38. The pressure sensor 42 will now provide a reading the same as or slightly less that of sensor 40 indicating that the variable flow restricting orifice is now set substantially the same as the fixed flow restricting orifice, i.e., calibrated. The smaller fixed orifice 50 determines a smaller maximum flow rate in line 16 than does the FIG. 4 orifice 46 which supplies line 14. This is particularly desirable when, for example, line 16 supplies a lesser number of individual ground engaging tools of the fertilizer applicator than does line 14.

Figure 6:
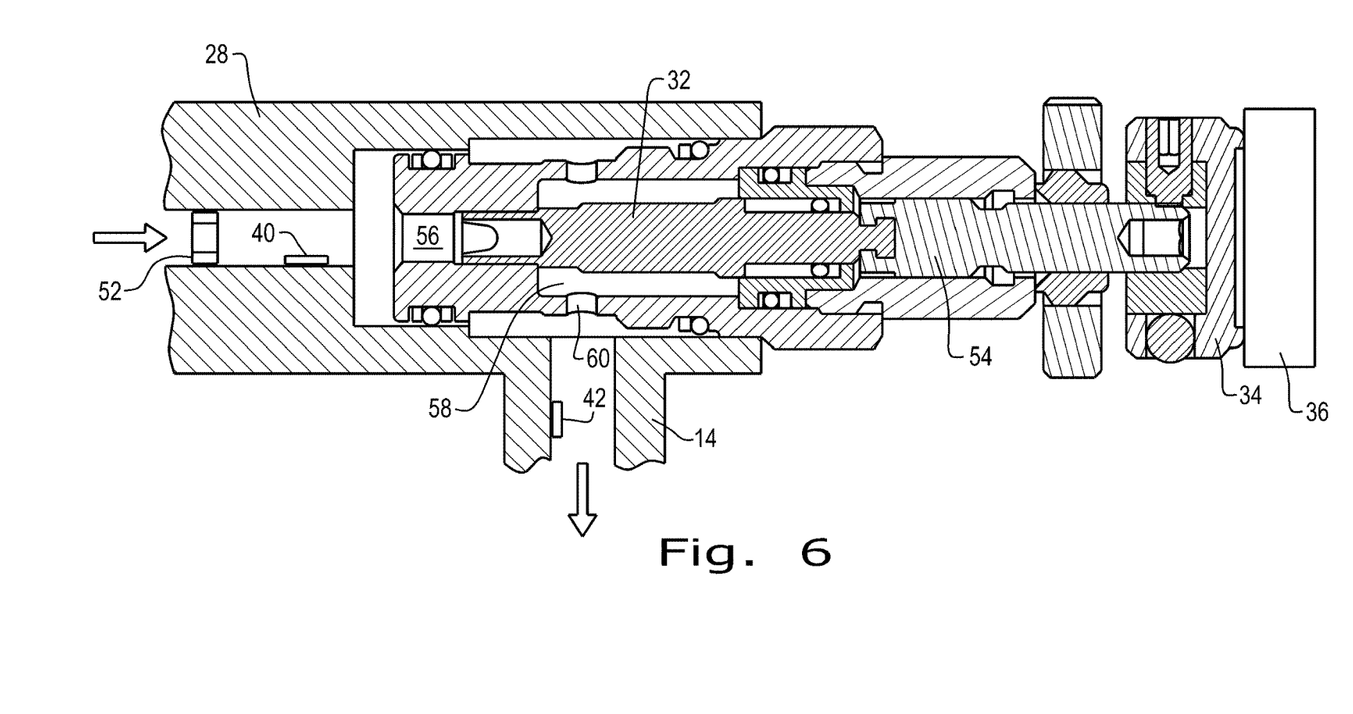
FIG. 6 is detailed cross-sectional view of an adjustable flow valve.

Further structural details of a suitable adjustable orifice valve are shown in FIG. 6. Here, the stepper motor 36 can rotate adjustment knob 34 and an adjustment screw 54. As the screw 54 rotates, the stem assembly 32 is translated left or right. Ammonia flow through the valve is through the fixed aperture 52 and into cavity 56, past the end of stem 32 into cavity 58. The flow then exits via sidewall openings such as 60.

In FIG. 1, each manifold outlet or exit line will be equipped with a variable flow restricting orifice generally like those discussed with reference to FIGS. 2-6. Fixed flow restricting orifices of sizes determining maximum flow rates for the individual exit lines will be installed upstream of the variable orifices. Pressure sensors such as 40 provide pressure measurements upstream of the fixed orifices and pressure sensors such as 42 provide the downstream pressure measurements.

Figure 7:
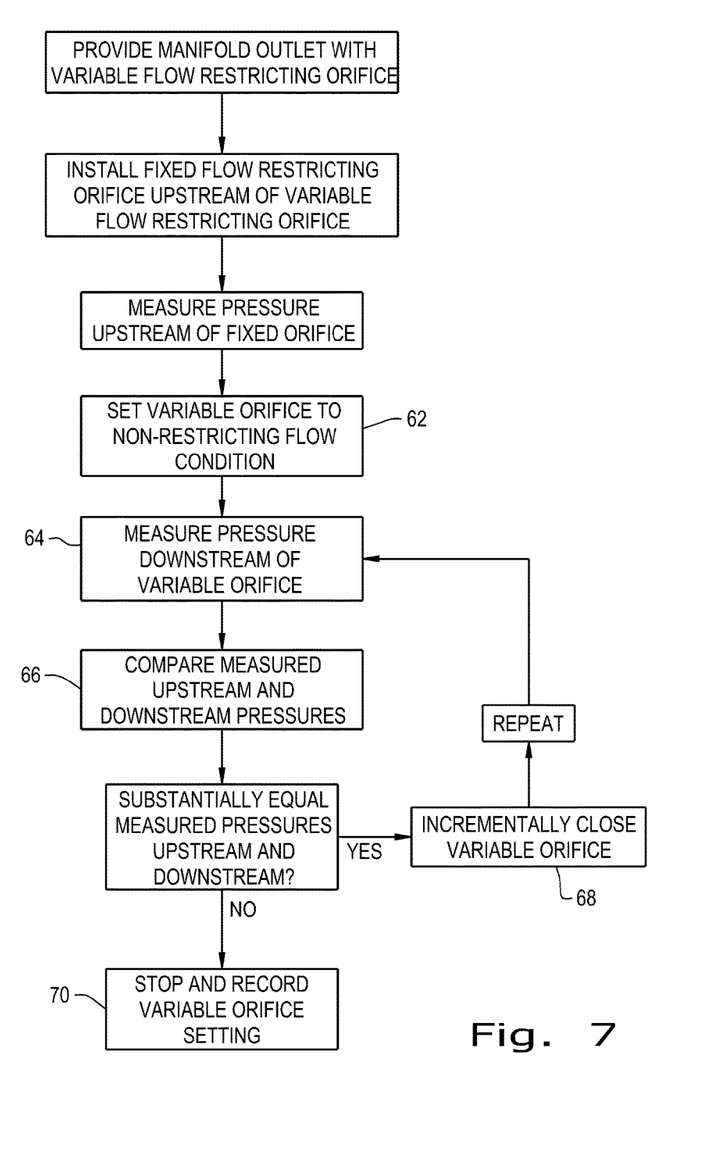
FIG. 7 is a flowchart of one calibration procedure according to the present invention.

Calibration of an individual variable flow restricting orifice is outlined in FIG. 7 and begins by opening the orifice to its maximum size or at least a size sufficient for the variable orifice to provide a pressure reading downstream which is no less than that measured by sensor 40. This is indicated by step 62. The measured downstream pressure (step 64) is compared at 66 to the upstream pressure and if the two measurements are substantially the same, the variable orifice is reduced in size by a small amount as shown at 68 and the pressure measurement and comparison repeated. When the downstream pressure drops appreciably, the current variable orifice setting is recorded and saved at 70 as a calibrated maximum flow setting for that exit line. The recorded maximum flow indicative status of each variable flow restricting orifice provides a benchmark setting from which other desired flow rates through those orifices may be realized. The process may then be repeated for each exit line as shown in FIG. 8.

Figure 8:
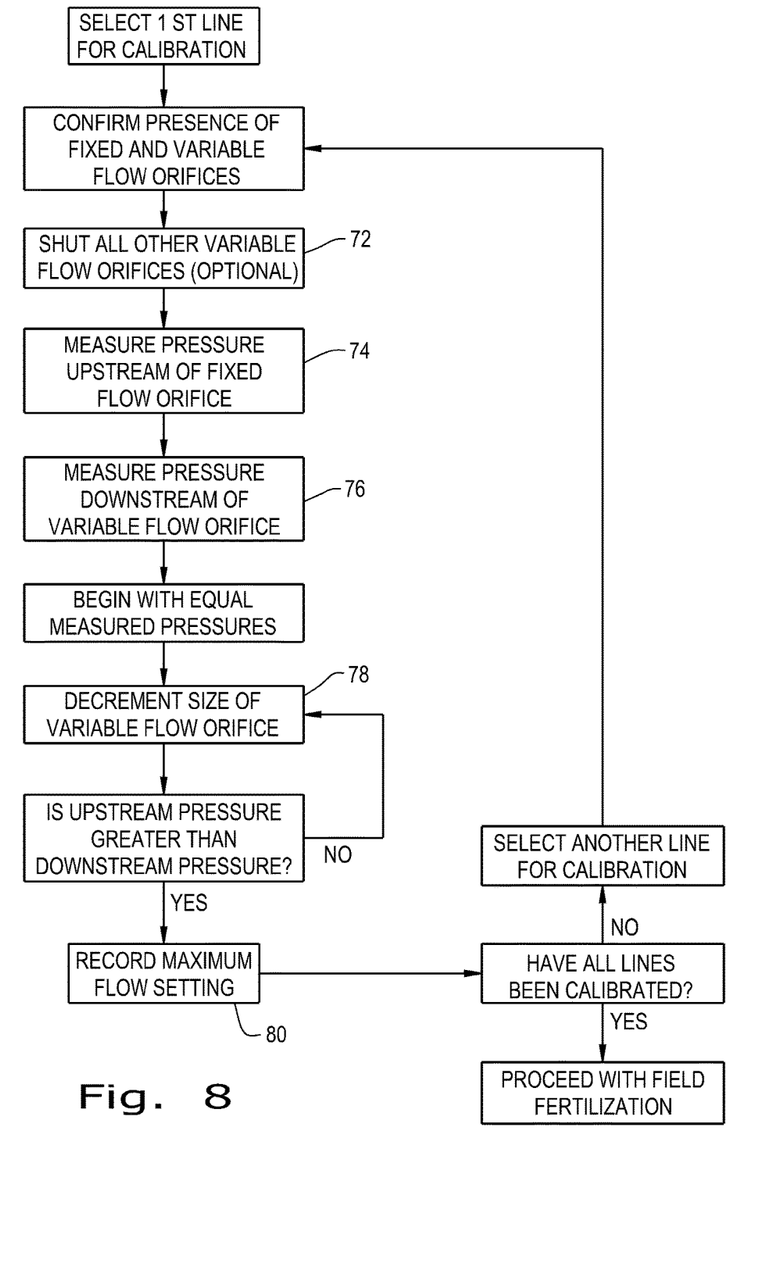
FIG. 8 is a flowchart of another calibration procedure according to the present invention.

The process of FIG. 8 begins by selecting an exit line, an appropriate fixed orifice and making sure a variable flow orifice is present and open sufficiently to not restrict the flow through the selected fixed orifice. Optionally, all other variable orifices may be closed as shown at 72. Measurements of upstream 74 and downstream 76 pressure are made. The process should begin with equal upstream and downstream pressures which should occur if the variable flow orifice is open sufficiently to not restrict the flow through the fixed orifice. The variable orifice size is decreased somewhat at 78 and decrementing and comparing continue until the upstream pressure exceeds the downstream pressure. The maximum flow setting of the variable orifice is recorded at 80. If all exit lines have been calibrated, field fertilization may proceed. Otherwise the process is repeated for another selected line.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of using an ammonia applicator for fertilizing an agricultural field, the method comprising: directing ammonia from a pressurized tank along a delivery path that extends through a manifold and multiple exit lines that extend from the manifold and are arranged for delivering ammonia onto an agricultural field; the method including the steps of:
   a) selecting a first of the multiple exit lines for calibration;
   b) ensuring that the selected exit line has a fixed flow restricting orifice of maximal size upstream of a variable flow restricting orifice;
   c) measuring the fluid pressure upstream of the fixed flow restricting orifice;
   d) measuring the fluid pressure downstream of the variable flow restricting orifice;
   e) beginning with equal pressures measured upstream and downstream; decreasing the size of the variable flow restricting orifice until the downstream measured pressure drops below the upstream measure pressure;
   f) recording a maximum flow indicative status of the variable flow restricting orifice of the selected exit line when the downstream measured pressure drops below the upstream measure pressure;
   g) if less than all exit lines have been calibrated, select a next exit line for calibration and repeat steps b) through g), wherein at least two fixed flow restricting orifices provide maximum flow rates differing from one another and further that known tolerances of the fixed flow restricting orifices are not relied on; and
   h) if all exit lines have been calibrated, proceed to use the ammonia applicator for fertilizing an agricultural field.

2. The method of claim 1, further comprising controlling the variable flow restricting orifice at each of the multiple exit lines so as to maintain a target flow characteristic of the ammonia through each of the multiple exit lines.

3. The method of claim 2, wherein the target flow characteristic of at least one of the multiple exit lines is different from the target flow characteristic of another one of the multiple exit lines.

4. The method of claim 3, wherein each of the variable flow restricting orifices includes a valve that can be controlled independently of each of the others so as to provide different ammonia delivery rates for the different multiple exit lines for achieving point row control in which ammonia can be applied at different delivery rates at different ground engaging tools at which the multiple exit lines deliver the ammonia to the agricultural field.

5. The method of claim 1, wherein the recorded maximum flow indicative status of each variable flow restricting orifice provides a benchmark setting from which subsequent flow rates through that orifice are realized.

6. The method of claim 1, wherein each exit line includes a variable flow restricting orifice, the method including completely shutting all variable flow restricting orifices except for the variable flow restricting orifice in the line selected for calibration.

7. A method of using an ammonia applicator for fertilizing an agricultural field, the method comprising; directing ammonia from a pressurized tank along a delivery path that extends through a manifold and multiple exit lines that extend from the manifold and are arranged for delivering ammonia onto an agricultural field and including the steps of:
   installing a fixed flow restricting orifice upstream of a variable flow restricting orifice;
   measuring the pressure upstream of the fixed flow restricting orifice;
   beginning with the variable flow restricting orifice in the maximum flow condition, repeatedly measuring the pressure downstream of the variable flow restricting orifice;
   repeatedly comparing the measured downstream pressure with the measured upstream pressure;
   incrementally closing the variable flow restricting orifice after each comparison so long as the measured pressure downstream of the variable flow restricting orifice and the pressure upstream of the fixed flow restricting orifice remain substantially the same;
   recording the variable flow restricting orifice maximum flow setting when the measured pressure downstream of the variable flow restricting orifice drops below the pressure upstream of the fixed flow restricting orifice; and
   repeating the recited steps for each of a plurality of exit lines, sequentially establishing a maximum flow rate setting for each exit line one at a time, wherein at least two fixed flow restricting orifices provide maximum flow rates differing from one another and further that known tolerances of the fixed flow restricting orifices are not relied on.

8. The method of claim 7, wherein the recorded maximum flow indicative status of each variable flow restricting orifice provides a benchmark setting from which subsequent flow rates are realized.

9. The method of claim 7, wherein the steps of beginning, comparing, incrementally closing and recording are performed with all variable flow restricting orifices completely closed except for the one which is incrementally closed.

10. A fluid material delivery system from a pressurized tank along a delivery path that extends through a manifold and at least two exit lines that extend from the manifold having remotely controllable variable flow orifices in each of the exit lines, the method of establishing maximum flow rate settings for each of the at least two variable flow restricting orifices, comprising the steps of:
   positioning a first fixed flow rate orifice establishing a first maximum flow rate in a first exit line upstream of a first variable flow restricting orifice;
   measuring the pressure upstream of the first fixed flow restricting orifice;
   beginning with the first variable flow restricting orifice in the maximum flow condition, repeatedly measuring the pressure downstream of the first variable flow restricting orifice;
   comparing the measured downstream pressure with the measured upstream pressure;
   incrementally closing the first variable flow restricting orifice after each comparison so long as the measured pressure downstream of the first variable flow restricting orifice and the pressure upstream of the first fixed flow restricting orifice remain substantially the same; and
   recording the first variable flow restricting orifice maximum flow setting when the measured pressure downstream of the first variable flow restricting orifice drops below the pressure upstream of the first fixed flow restricting orifice;

positioning a second fixed flow rate orifice establishing a second maximum flow rate in a second exit line upstream of a second variable flow restricting orifice such that the second maximum flow rate differs from the first maximum flow rate and further that known tolerances of the first and second fixed flow rate orifices are not relied on;

measuring the pressure upstream of the second fixed flow restricting orifice;

beginning with the second variable flow restricting orifice in the maximum flow condition, repeatedly measuring the pressure downstream of the second variable flow restricting orifice;

comparing the measured pressure downstream of the second variable flow restricting orifice with the measured pressure upstream of the second fixed flow restricting orifice;

incrementally closing the second variable flow restricting orifice after each comparison so long as the measured pressure downstream of the second variable flow restricting orifice and the pressure upstream of the second fixed flow restricting orifice remain substantially the same; and recording the second variable flow restricting orifice maximum flow setting when the measured pressure downstream of the second variable flow restricting orifice drops below the pressure upstream of the second fixed flow restricting orifice.

11. The method of claim 10, including the additional steps of utilizing the recorded maximum flow settings to adjust the variable flow restricting orifices to distribute fluid material at rates configured for the two lines which are less than the determined maximum flow rates.

12. The method of claim 10, wherein there are a plurality of exit lines extending from the manifold, the method including the additional steps of repeating each recited step for each exit line.

13. The method of claim 10, wherein the step of measuring the pressure downstream of the first variable flow restricting orifice is performed with the second variable flow restricting orifice completely closed and the step of measuring the pressure downstream of the second variable flow restricting orifice is performed with the first variable flow restricting orifice complete closed.

* * * * *